United States Patent
Arai

[11] 3,768,532
[45] Oct. 30, 1973

[54] MAGNET TIRE

[76] Inventor: Isamu Arai, 4735 Sasage-cho, Konan-ku, Yokohama, Japan

[22] Filed: Jan. 17, 1972

[21] Appl. No.: 218,209

[52] U.S. Cl. .................................. 152/151, 152/158
[51] Int. Cl. ............................................. B60c 17/00
[58] Field of Search .................... 152/1, 151, 158, 152/180, 193; 104/148 MS; 308/10

[56] References Cited
UNITED STATES PATENTS
833,635   12/1972   Rogers ....................... 104/148 MS
2,704,231   3/1955   Goldsmith ............................ 308/10
3,158,765   11/1954   Polyreen ...................... 104/148 MS
3,216,349   11/1965   Kraft .................................... 308/10

*Primary Examiner*—Drayton E. Hoffman
*Attorney*—George B. Oujevolk

[57] ABSTRACT

A magnet tire adapted for use on a wheel designed for use with a conventional pneumatic rubber tire, in which the magnetic zones are formed along the inside face of the tire tread and along the tire mounting face of the rim, respectively, such that said zones are opposed to each other, with their opposed faces having magnetism of same polarity.

1 Claim, 1 Drawing Figure

PATENTED OCT 30 1973  3,768,532
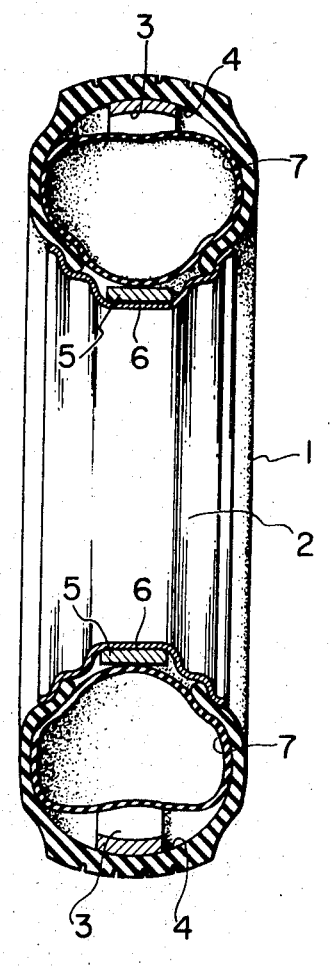

MAGNET TIRE

BACKGROUND OF THE INVENTION

The present invention relates to providing an additional restoring force to a pneumatic rubber tire, and more particularly to providing a magnetic restoring force.

BRIEF DESCRIPTION OF THE PRIOR ART

Most of the conventional rubber tires of this type are used with air pumped thereinto through or without the medium of an inner air-tube. According to such conventional tires, however, the tread tends to shrink toward the center whenever load is given thereto, so that it was difficult or almost impossible for a vehicle carrying such tires to run along a snow-laden road, a muddy road or a sandy way. Further, in case a wheel of the vehicle should fall into a ditch or a depression, the tire on that wheel may be deformed by the impact, causing the rim to crash against a corner of the ditch or other object to let it suffer damage.

The present invention is to provide an improvement in such tires so as to eliminate the defects, such as mentioned above, which accompany the conventional tires.

BRIEF DESCRIPTION OF THE DRAWING

The sole FIGURE of the drawing shows a transverse sectional view of a magnet tire according to the present invention.

SUMMARY OF THE INVENTION

This invention relates to a rubber tire for use in a surface-running vehicle such as automobile, and more particularly it relates to such rubber tire adapted to be mounted on a wheel designed for use with a conventional pneumatic rubber tire, in which the magnetic strips are provided, in opposed relation to each other, on the inside face of the tire tread and on the tire mounting face of the rim, respectively such that their opposed faces will have magnetism of same polarity, whereby to eliminate the troubles accompanying the conventional tires, such as mentioned above.

The invention will now be described in detail by way of its embodiment with reference to the accompanying drawing. Referring to the drawing, there is shown part of a rubber tire, generally designated 1, which has attached thereto a rim 2 of a wheel adapted for fitting said tire 1 thereover. Along the inside surface of the tread of said rubber tire 1 is fixed a magnet belt 3 by means of an adhesive. There is also provided a similar magnet belt 5 fixed, as by an adhesive, along the tire mounting face 6 of said rim 2. Said both magnet belts 3 and 5 are so adapted that their opposed faces will bear magnetism of same polarity, and that said magnetism will be of such intensity as will produce most effective repulsion according to the distance between said both magnet belts 3 and 5.

Although magnet belts are used in the embodiment shown, the magnetic means used on the inside face of the tire tread and on the tire mounting face of the rim may be provided by magnetizing the tread and the rim themselves, or other various suitable methods may be employed without departing from the scope of the present invention. It may also be understood that the present invention finds may applications for various types of tires, whether tube or tubeless.

Thus according to the present invention, a pair of magnet belts are provided in such a manner that their opposed faces have magnetism of same polarity, so that due to joint action of air pressure and magnetic pressure produced in the vertical direction by the repelling force between the magnet belts relative to the ground-engaging face of the tire, greater restorability is obtained than that of a conventional tire where air alone is pressed in. This enlarged restorability provides resistance against deformation of the tread by loading, thus enabling the vehicle to run along a bad road, such as a snow-laden road, mire or sandy road. Further, in case the car is mired in a ditch or a depression in the road and the tire is deformed upon receiving momentary impact to cause approach of the tread to the rim surface, the magnetic repulsion between the magnet belts is increased in proportion to the degree of approach of the tread to the rim surface, thus preventing them from coming into contact with each other so as to preclude any possibility of causing damage to the rim. Thus, the present invention provides a novel tire having excellent cushioning property and high stability.

What I claim is:

1. In a tire with a tread, a rim, and a wheel combination wherein a rubber tire is fastened to a wheel rim by mounting said tire on the tire mounting face of said rim, the improvement therein wherein a first magnet belt is affixed to the inner peripheral surface of said tire tread and a second magnetic belt is affixed to the outer peripheral surface of said tire mounting face concentric with said first magnetic belt so that the inner face of said first belt faces the outer face of said second belt, said belts being so arranged and disposed that their opposed faces will have magnetism of the same polarity.

* * * * *